United States Patent Office 2,785,163
Patented Mar. 12, 1957

2,785,163

PROCESS FOR THE FORMYLATION OF A 5-NITROSOURACIL

John Swidinsky, Newark, and Manuel M. Baizer, Union N. J., assignors to The New York Quinine and Chemical Works, Inc., New York, N. Y.

No Drawing. Application April 23, 1954, Serial No. 425,314

2 Claims. (Cl. 260—256.4)

Our invention relates to a method of making xanthines from 4-amino-5-nitrosouracils which bear hydrogen or a lower alkyl group such as methyl in the 1-position of the molecule, and a lower alkyl group such as methyl in the 3-position of the molecule. These xanthines are useful drugs, for example, caffeine is a widely used stimulant which is described in the United States Pharmacopeia XIV (1950).

A synthesis of caffeine from such a uracil compound dates from the pioneering work of W. Traube reported in Berichte der deutsch. Chem. Ges. 33, 3052, 1900. The following reaction scheme illustrates the method:

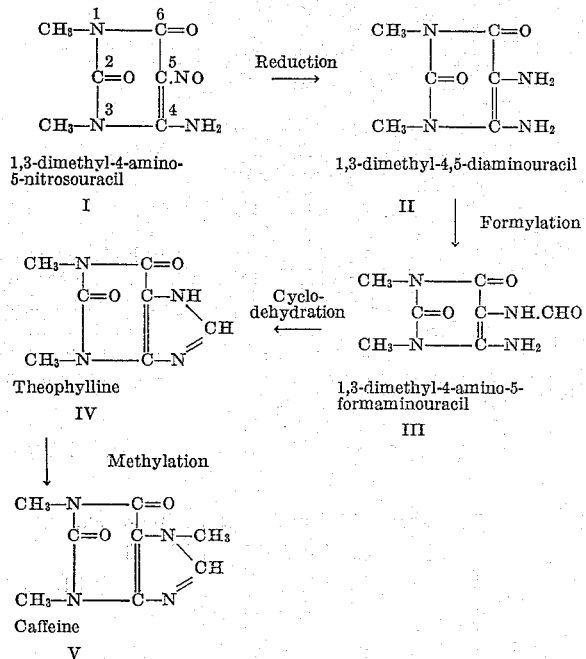

Numerous attempts have been made to commercialize this laboratory synthesis, but none of them has given complete satisfaction. It is now recognized that certain operating conditions must be observed in this synthesis in order to produce caffeine most economically under modern manufacturing conditions. It is desirable that the process: (1) give high yields of caffeine, (2) use inexpensive reagents for affecting the transformations indicated above, (3) avoid the introduction of substances or the formation of by-products which must be removed, thereby adding to processing costs, (4) use simple equipment not requiring special design or complicated safety controls as in catalytic hydrogenation, (5) minimize the amount of handling, e. g. filtrations, distillations, required in the processing, (9) obtain a product easily purified to United States Pharmacopeia standards, and (7) avoid the need for recovering expensive solvents.

The reduction step has been carried out in the prior art by using ammonium sulfide (Traube, loc. cit.) or metal, (e. g. zinc) and acid (PB Report 86142), or catalytically with nickel and hydrogen (PB Report 1246, Sept. 18, 1945, page 96), or palladium and hydrogen (U. S. Patent 2,646,432.) These methods make it necessary either to remove sulfur or zinc salt from the reaction mixture, or to purify II (which discolors readily), or to employ catalytic hydrogen reduction with its attendant hazards.

The formylation step has been performed in the prior art using formic acid (Traube, loc. cit.), or sodium formate and sulfuric acid (PB Report 86142), or formamide (Bredereck, Germ. Patent 864,868, Jan. 29, 1953; CA 47, 11238B (1953). In the latter case II may be converted to IV without prior isolation of III, but IV must be isolated before it can be converted to V.

The reduction and formylation stages may be combined when I is treated with zinc and formic acid (C. A. 41, 96i, 1947; Germ. Patent 859,311, Dec. 11, 1952, C. A. 47, 11262d, 1953). Over 20 moles of formic acid per mole of I are used. Zinc formate must be removed and for economy's sake excess formic acid must be recovered.

It is apparent, therefore, that the prior art methods are defective because they do not meet all the requirements for safe, simple and economic manufacturing purposes.

It is an object of our invention to provide a highly economical process for producing caffeine of high purity without isolating or purifying any of the intermediates between I and V.

It is a further object of our invention to transform I to III in a single operation without the introduction of extraneous reagents and therefore to convert I to V in substantially a two-step operation. Other objects will be apparent from the following description.

We have discovered that when I is treated with formic acid in the presence of a catalyst it is directly converted to III in high yield and in high state of purity. It is not necessary to isolate III in order to proceed with the preparation of high quality V.

The medium may be water or an inert non-aqueous solvent such as 90% isopropyl alcohol, commercial strength.

The catalyst is preferably one of the platinum group, such as platinum, palladium, rhodium, and the like. It may be employed in the form of finely divided metal or colloidal dispersion on a support such as charcoal, pumice, and the like.

Since formic acid is the reductive formylating agent and since carbon dioxide is evolved, the entire reaction, when water is used as the medium, may be conducted in an open vessel such as a beaker or a kettle. When isopropyl alcohol is the reaction medium, it is preferable to conduct the reaction in a vessel equipped for returning vaporized alcohol.

The quantity of formic acid used my be varied within rather wide limits ranging from about 3.5 moles of acid per mole of I to 5 or more moles per mole of I. We prefer to use about 4 moles of formic acid to one mole of I. The formic acid is best added as the commercially available 85–90% solution.

The volume of solvent used may likewise be varied considerably. We prefer to use a quantity which will allow efficient stirring of the reaction mixture at all times and find this quantity to be about 10 ml. per gram of I charged.

The quantity of catalyst employed depends upon the reaction speed desired and also upon whether it is desired to re-use the catalyst. Using a 5% palladium-on-charcoal catalyst, e. g., we prefer to use of it about 4% by weight of I and to re-use the catalyst.

The following examples illustrate our invention:

Example 1.—Preparation of caffeine

A mixture of 101 grams of I monohydrate (.5 mole), 1033 ml. of 87.1% isopropyl alcohol and 4.00 grams of 5% palladium-on-charcoal was stirred vigorously at room temperature. Then 108 grams of 85% formic acid was added. An exothermic reaction occurred and carbon dioxide was evolved. When the temperature rose to 40–45° C. (about 30 minutes), III began to precipitate. The temperature was raised to 65° C. in the course of about one hour, then gradually to 75° C. and finally to reflux. Gas evolution had then subsided and the pink-purple particles of I had disappeared in about two and one-half to three hours from the start. Large quantities of III were in suspension. One liter of water was added to dissolve III and the solution was heated and filtered to remove the catalyst. The filtrate was heated in the presence of a trace of zinc dust to distill out the isopropyl alcohol for recovery. When the head temperature was 95–100° C., strong NaOH was added to bring the pH to 10.5 or higher, the solution was boiled for a short time, cooled, and methylated with dimethylsulfate in the usual manner. At the end of the methylation, the pH was adjusted and the solution charcoaled, brought to 600–650 ml. and chilled. After removal of the first crop of caffeine, a second crop was recovered from a volume of about 300 ml. The combined crops, after drying to constant weight at 100° C. weighed 78.0 grams (80.5% based on I). The color was off-white and the melting point was about 230° C. (corr.). The melting point given in the United States Pharmacopeia XIV (1950) for caffeine is 235 to 237.5°. The mother liquor was extracted thoroughly with chloroform. The extracts were taken to dryness and the residue dried at 100° C. It weighed 6.9 grams. After recrystallization from water (with the aid of charcoal and zinc dust) it yielded 2.6 grams (2.7%) of crude off-white caffeine.

Instead of adding water to dissolve III at the end of the reductive-formylation, the reaction mixture may be cooled to room temperature or below and the mixture of III and catalyst removed by filtration and washed with isopropyl alcohol. (Since the solubility of III in the alcohol is extremely low, this procedure allows us to obtain III in almost white condition and to avoid all but minor decrease in the original strength of the isopropyl alcohol.) Then III is dissolved in hot water and the catalyst is removed by filtration. The aqueous solution is brought to pH 10.5 or higher and the procedure continued as on page 5 line 18.

If desired, this process can be interrupted when theophylline (IV) has been produced and this compound is wanted.

Example 2.—Preparation of 3-methyl-xanthine

A mixture of 5.10 g. of 3-methyl-4-amino-5-nitrosouracil (prepared according to Traube, Ber. 33, 3035, 1900), 50 ml. of 99% isopropyl alcohol, 0.20 g. of 5% palladium-on-charcoal, and 6.5 g. 85% formic acid was stirred vigorously at 45° to reflux for 2.25 hours. The pink color of the nitroso compound disappeared completely. The mixture of 3-methyl-4-amino-5-formamino-uracil and catalyst was removed by filtration. The net weight of formyl compound minus catalyst was 5.08 g. (92.3%).

To the formyl compound-catalyst mixture was added 8 g. of a 20% NaOH solution. The mixture was heated on the steam bath for 30 minutes, diluted with 35 cc. of water and filtered to remove the catalyst. The filtrate was acidified to pH 5–5.5 with 2 N sulfuric acid. The light yellow solid was filtered off, washed with water and dried at 110°. It weighed 3.83 g. (83.4%) and was 3-methyl-xanthine as shown by its conversion to a perchlorate M. P. 227–228° (Bredereck, Chem. Ber. 86, 853, 1953, reports 227–229°) and by its methylation to caffeine, M. P. 229–231°, no depression with authentic caffeine.

The 3-methyl-xanthine may be converted to theobromine or caffeine by known methods.

Inert solvents other than isopropyl alcohol, such as methyl-, ethyl-, or butyl alcohol, may be used in this reaction. It will be seen from Example 1 that our process conforms closely to the optimal operating conditions of caffeine manufacture outlined above. The process greatly simplifies the manufacture because it is performed without interruption and it passes through three intermediate stages without requiring isolation of the intermediates. Yet it avoids the formation of by-products as is evidenced by the high yield of substantially pure caffeine. It combines catalytic reduction and formylation in one step of reductive formylation of I to III. This expedient is entirely novel and proceeds with surprising smoothness.

We have thus been able to accomplish our objects and while our specification discloses the preferred operating conditions of our process, we consider all equivalent conditions and materials to be within the scope of our invention and of our appended claims.

What we claim is:

1. The catalytic reductive formylation of a 5-nitrosouracil derivative of the formula

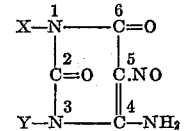

wherein X stands for hydrogen or a lower alkyl group and Y stands for a lower alkyl group, which comprises the steps of mixing the uracil derivative with an inert non-aqueous solvent, formic acid and a catalyst of the platinum group dispersed on a support, stirring the mixture and warming moderately until the color of the nitrosouracil has substantially disappeared.

2. The process of claim 1 in which the inert, non-aqueous solvent is isopropyl alcohol and the catalyst is 5% palladium-on-charcoal.

References Cited in the file of this patent

UNITED STATES PATENTS 2,646,432     Homeyer _____ July 21, 1953

OTHER REFERENCES

Traube: Ber. Deut. Chem. 33, 3040, 3049–50 (1900).
Bobranski et al.: J. Am. Pharm. Assoc. 37, 62–64 (1948).